US007359089B2

(12) United States Patent
Imai

(10) Patent No.: US 7,359,089 B2
(45) Date of Patent: Apr. 15, 2008

(54) IMAGE PROCESSING METHOD AND APPARATUS

(75) Inventor: Hitoshi Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 10/729,923

(22) Filed: Dec. 9, 2003

(65) Prior Publication Data

US 2004/0114167 A1 Jun. 17, 2004

(30) Foreign Application Priority Data

Dec. 10, 2002 (JP) ............................. 2002-358312

(51) Int. Cl.
*H04N 1/60* (2006.01)
*H04N 1/56* (2006.01)
*G06K 15/02* (2006.01)
*G06K 9/00* (2006.01)

(52) U.S. Cl. ...................... 358/1.9; 358/3.24; 358/518; 382/162; 382/167

(58) Field of Classification Search ................ 358/1.9, 358/443, 530, 500–501, 515, 1.1, 1.2, 1.5, 358/1.15, 1.16, 1.17, 1.13; 382/162–165, 382/167

See application file for complete search history.

(56) References Cited

U.S. PATENT DOCUMENTS 5,748,343 A    5/1998  Ikeda ......................... 358/501
6,323,958 B1 * 11/2001  Shimizu ...................... 358/1.9
6,490,055 B1 * 12/2002  Shimizu ...................... 358/1.9
6,963,412 B1 * 11/2005  Toda ......................... 358/1.13
2002/0122193 A1 * 9/2002  Shirasawa ................... 358/1.9

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

Provided is an image processing method and apparatus in which drawing objects are collected on a group-by-group basis and rendering is switched between YMCK rendering and RGB rendering to thereby raise the image quality of a YMCK output image and mitigate a decline in processing speed. To achieve this, PDL (401) is input to an interpreter (402), which translates the PDL to drawing objects. It is then determined whether the rendering of the drawing objects is to be performed in the RGB format or YMCK format. As a result, drawing objects obtained by translation are rendered in the RGB format by an RGB renderer (407), whereby an RGB image is created, and drawing objects obtained by translation are rendered in the YMCK format by a YMCK renderer (404), whereby a YMCK image is created. The RGB image is color-converted to a YMCK image by color conversion and HT processing (409), and the YMCK image is output together with the YMCK image created by the RGB renderer (404).

8 Claims, 12 Drawing Sheets

FIG. 12
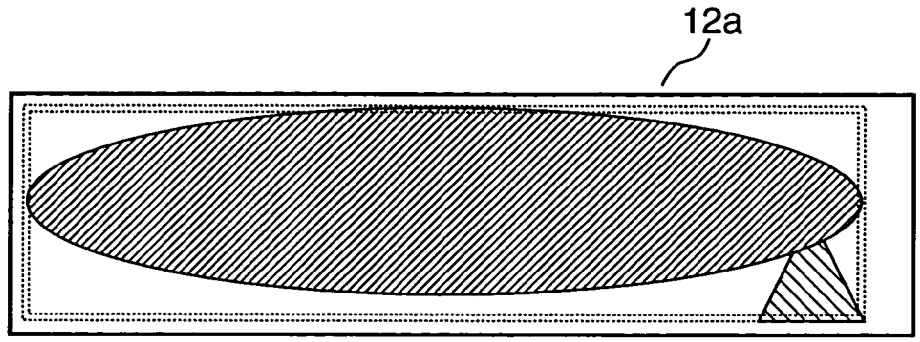
☒ YMCK DRAWING OBJECT
◩ RGB DRAWING OBJECT
⋯⋯ RGB RENDERING GROUP
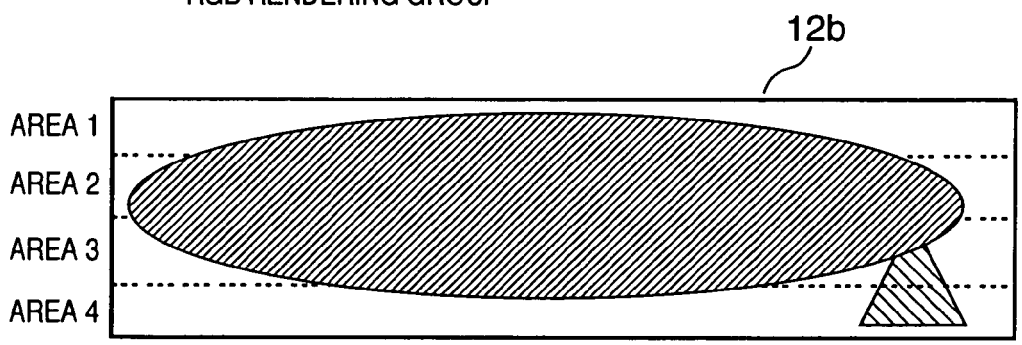
- - - - RENDERING-AREA DIVIDING LINES
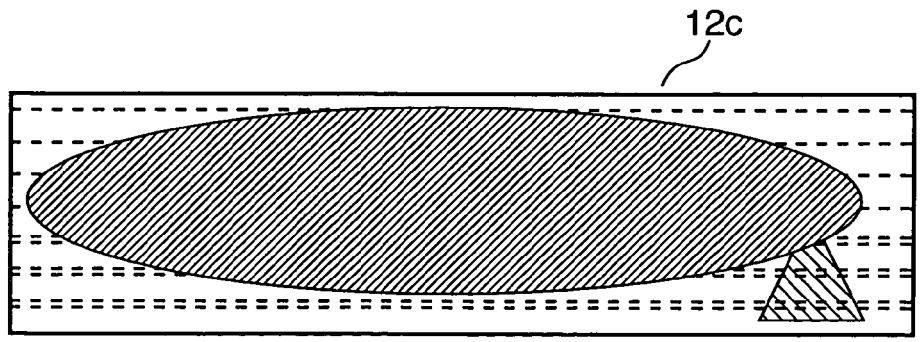
- - - - YMCK RENDERING LINE
= = = = RGB RENDERING LINE

IMAGE PROCESSING METHOD AND APPARATUS

FIELD OF THE INVENTION

This invention relates to an image processing technique for outputting a color image as a YMCK image.

BACKGROUND OF THE INVENTION

In a situation where a YMCK output image is obtained in a conventional image processing apparatus, either a YMCK output image is obtained by performing rendering in a YMCK format or by applying color conversion and HT processing after rendering is performed in an RGB format.

In a case where a YMCK output image is obtained, a high speed is achieved in accordance with rendering in the YMCK format. However, a problem which arises is that color error is produced by a part of the image processing such as rendering or translucent processing using rendering logic. With rendering in the RGB format, the color error produced when YMCK rendering is carried out can be reduced by the aforementioned structure in which color conversion and HT processing are applied. However, the problem here is that implementation at high speed is difficult.

SUMMARY OF THE INVENTION

The present invention has been proposed to solve the problems of the prior art and its object is to provide an image processing method and apparatus in which drawing objects are collected on a group-by-group basis and rendering is switched between YMCK rendering and RGB rendering to thereby raise the image quality of a YMCK output image and mitigate a decline in processing speed.

According to the present invention, the foregoing object is attained by providing an image processing method comprising: an input step of inputting an image processing apparatus control code; a translation step of translating the image processing apparatus control code into a drawing object; a judging step of judging whether rendering of a drawing object is to be performed in an RGB format or YMCK format; a first rendering step of rendering a drawing object in one image, which has been obtained by translation at the translation step, in the RGB format, thereby creating an RGB image; a second rendering step of rendering another drawing object in an image the same as the one image, which has been obtained by translation at the translation step, in the YMCK format, thereby creating a YMCK image; a color conversion step of color-converting the RGB image to a YMCK image; and an output step of outputting the YMCK image created by the second rendering step and the YMCK image obtained by the color conversion at the color conversion step.

Further, according to the present invention, the foregoing object is attained by providing an image processing apparatus comprising: input means for inputting an image processing apparatus control code; translation means for translating the image processing apparatus control code into a drawing object; judging means for judging whether rendering of a drawing object is to be performed in an RGB format or YMCK format; first rendering means for rendering a drawing object in one image, which has been obtained by translation by the translation means, in the RGB format, thereby creating an RGB image; second rendering means for rendering another drawing object in an image the same as the one image, which has been obtained by translation by the translation means, in the YMCK format, thereby creating a YMCK image; color conversion means for color-converting the RGB image to a YMCK image; and output means for outputting the YMCK image created by the second rendering means and the YMCK image obtained by the color conversion by the color conversion means.

By using the image processing method and image processing apparatus set forth above, it is possible to mitigate the problem of color error, which occurs at the time of image processing, in the output image of the color renderer, and it is also possible to mitigate the decline in speed that occurs with the RGB renderer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram useful in describing the processing of rendering data composed of a YMCK drawing object and an RGB drawing object in a second embodiment of the present invention.

DETAILED DESCRIPTION OF THE PREFERRED EMBODIMENTS

First Embodiment

An image processing apparatus to which an image processing method according to the present invention is applied will be described with reference to the drawings. In the embodiments, the image processing apparatus is implemented using, in particular, a laser printer.

<Structure of the Apparatus>

Figure 1:
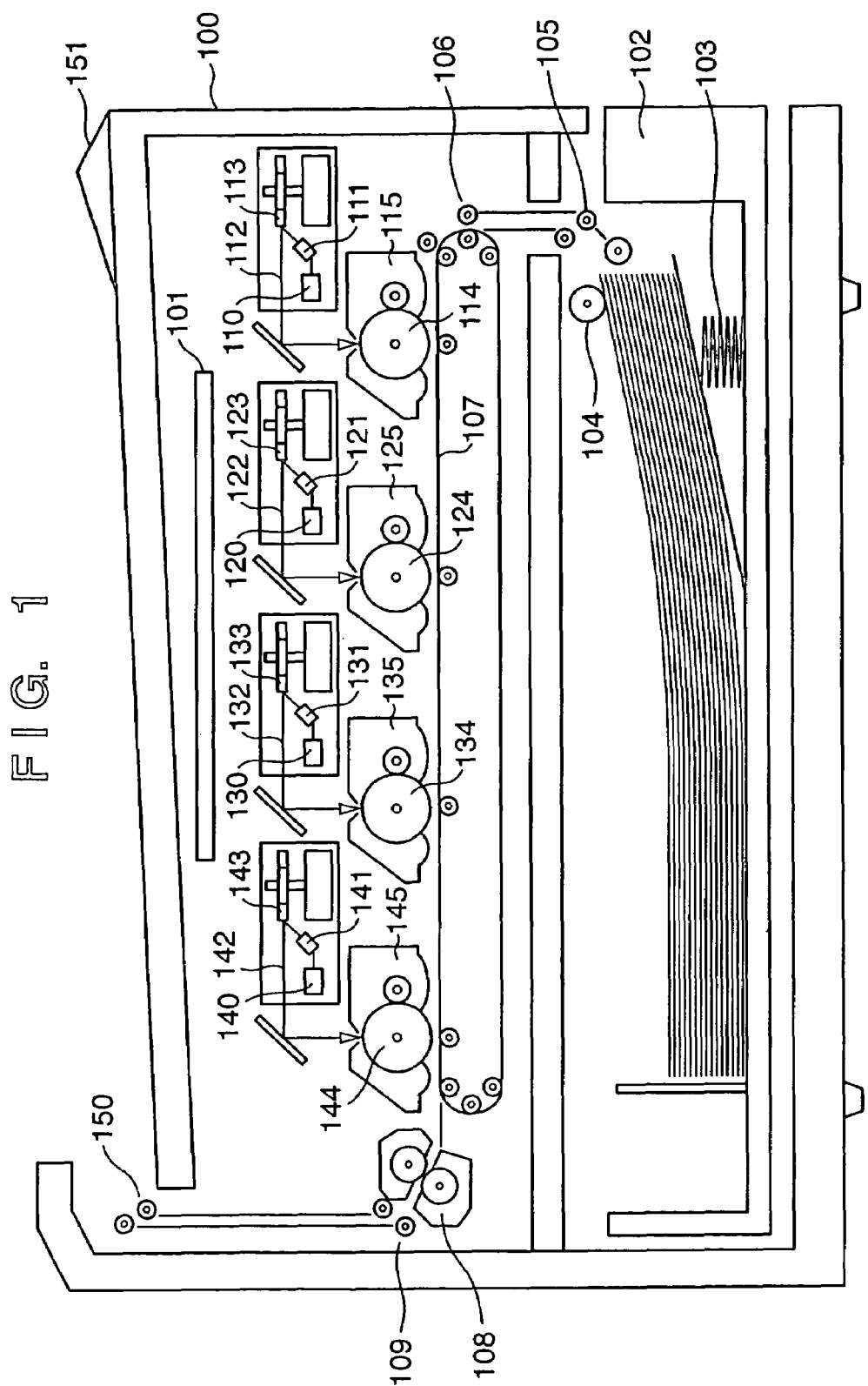
FIG. 1 is a sectional view illustrating the internal structure of a laser printer according to a first embodiment of the present invention.

FIG. 1 is a sectional view illustrating the internal structure of a laser printer according to the present invention. A laser printer 100 in FIG. 1 is supplied with commands from an externally connected host computer (200 in FIG. 2, described later). In accordance with the commands, such as a character printing command, various graphics rendering commands, an image rendering command and a color specifying command, the laser printer 100 creates corresponding character patterns, graphics and pictures, etc., and forms these images on printing paper serving as a printing medium. A control panel 151 includes an array of switches for operation as well as an LED display device or LCD display device for displaying the status of the printer.

A printer control unit 101 controls the overall laser printer 100 and analyzes commands such as the character printing command supplied from the host computer. In order to convert RGB color information to M (magenta), C (cyan), Y (yellow) and K (black), for this color information into images and develop them concurrently, the laser printer of this embodiment has image forming and developing mechanisms for respective ones of the colors MCYK.

The printer control unit 101 generates print images of the colors MCYK, converts these to video signals and outputs the video signals to laser drivers of the colors MCYK. An M (magenta) laser driver 110, which is a circuit for driving a semiconductor laser 111, turns a laser beam 112, which is emitted from the semiconductor laser 111, on and off in accordance with the video signal applied thereto. The laser beam 112 is swept to the left and right by a rotating polygonal mirror 113 so as to scan a electrostatic drum 114. As a result, an electrostatic latent image of a character or graphic pattern is formed on the electrostatic drum 114. The latent image is developed by a developing unit (a toner cartridge) surrounding the electrostatic drum 114, after which the developed image is transferred to printing paper.

It should be noted that image forming and developing mechanisms similar to those for the color M (magenta) are provided for the colors C (cyan), Y (yellow) and K (black) as well. Specifically, reference numerals 120, 121, 122, 123, 124 and 125 denote the image forming and developing mechanisms for C (cyan) in the laser printer 100, reference numerals 130, 131, 132, 133, 134 and 135 denote the image forming and developing mechanisms for Y (yellow), and reference numerals 140, 141, 142, 143, 144 and 145 denote the image forming and developing mechanisms for K (black). The functions of these mechanisms are the same as those of the image forming and developing mechanisms for M (magenta) and need not be described.

Cut sheets are used as the printing paper and are stored in a paper cassette 102 that has been loaded in the laser printer 100. As shown in FIG. 1, the cut sheets of printing paper, which are held at fixed height by a spring 103, are f d into the apparatus by a feed roller 104 and transport rollers 105, 106 so as to be placed on a paper conveyance belt 107, whereby the cut sheets pass by the image forming and developing mechanisms of each of the colors MCYK.

The toners (powdered inks) of MCYK that have been transferred to the printing paper are fixed to the printing paper by heat and pressure by a fixing unit 108, after which the paper is delivered to the upper part of the laser printer 100 by transport rollers 109, 150.

<Functional Structure>

Figure 2:
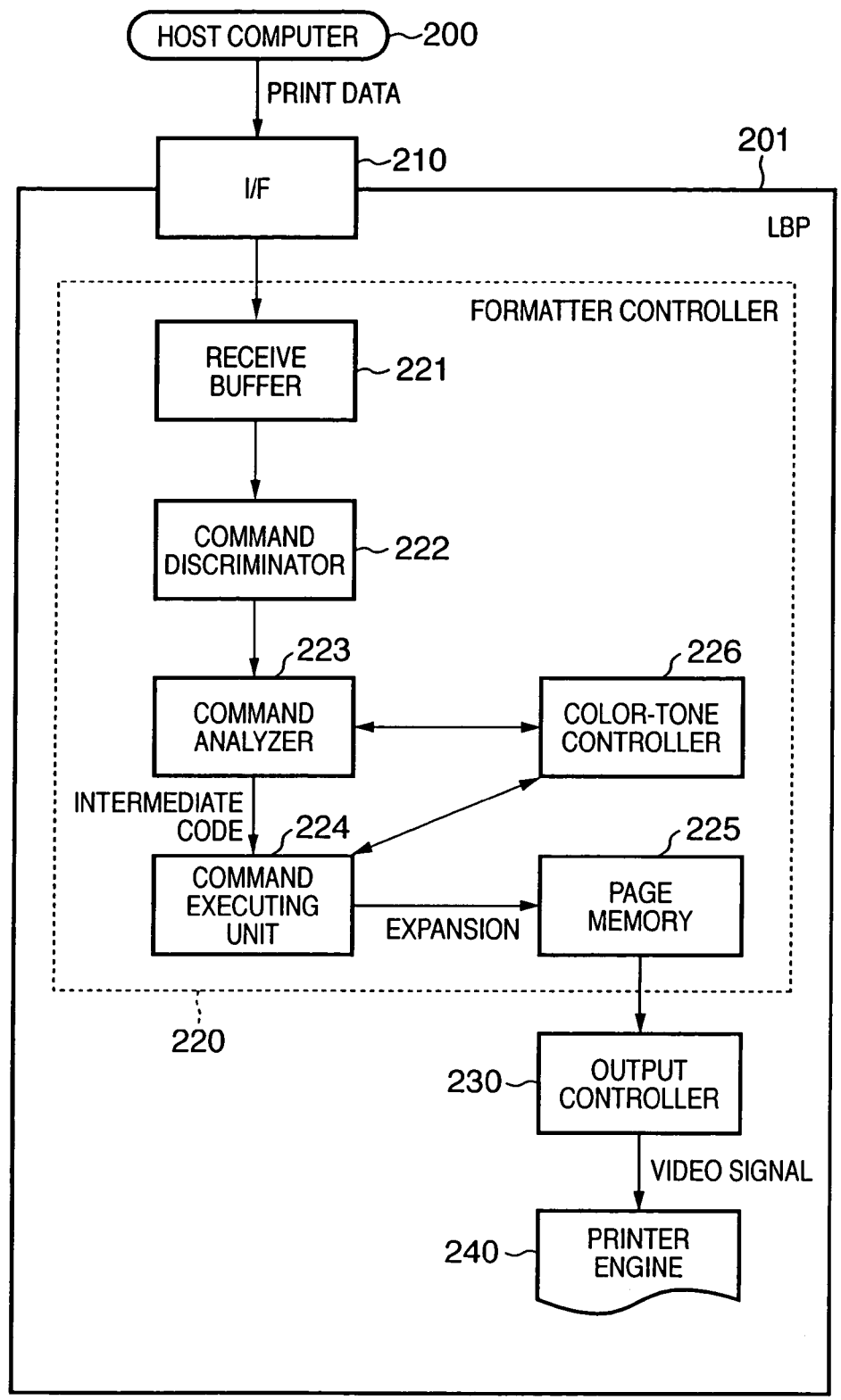
FIG. 2 is a block diagram illustrating the functional structure of the laser printer according to the first embodiment of the present invention.

FIG. 2 is a block diagram illustrating the functional structure of the laser printer according to the first embodiment of the present invention. A laser printer 201 in FIG. 2 is a functional block representation of the laser printer 100 of FIG. 1, namely the image processing apparatus according to this embodiment of the present invention. Further, reference numeral 200 denotes a host computer connected to the laser printer 201. The host computer 200 outputs print information, which comprises print data and control codes, to the laser printer 201.

As shown in FIG. 2, the laser printer 201 mainly includes a formatter controller 220, an interface (I/F) 210, an output controller 230 and a printer engine 240.

The formatter controller 220 comprises a receive buffer 221, a command discriminator 222, a command analyzer 223, a command executing unit 224, a page memory 225 and a color-tone controller 226. The receive buffer 221 serves as storage means for temporarily holding print information received from the host computer 200. The command discriminator 222 serves as discriminating means for discriminating each print control command. Print data that has been output from the host computer 200 is analyzed in the command analyzer 223 in accordance with the command discriminated by the command discriminator 222. Specifically, the command analyzer 223 serves as analyzing means for analyzing each print control command.

A command that has been analyzed by the command analyzer 223 is an intermediate result of analysis of print data and is converted into the form of an intermediate code having a format easier to process in the command executing unit 224. In a case where the command discriminator 222 has determined that a print control command is a command that accompanies expansion into an intermediate code of a character of graphic, etc., color-attribute control is carried out by the color-tone controller 226. Specifically, the color-tone controller 226 converts a specified color into a color that is optimum with regard to the user who initiated print processing. Further, the command executing unit 224 executes each command in accordance with the intermediate code so that commands relating to rendering and printing will be expanded successively in the page memory 225.

In general, the formatter controller 220 is implemented by a computer system that employs a CPU, a ROM and a RAM, etc. Further, the output controller 230 executes processing to convert the content of the page memory 225 to a video signal and transfers the image to the printer engine 240. The latter is a printing mechanism for forming the received video signal on paper as a permanent visible image.

<System Configuration>

Figure 3:
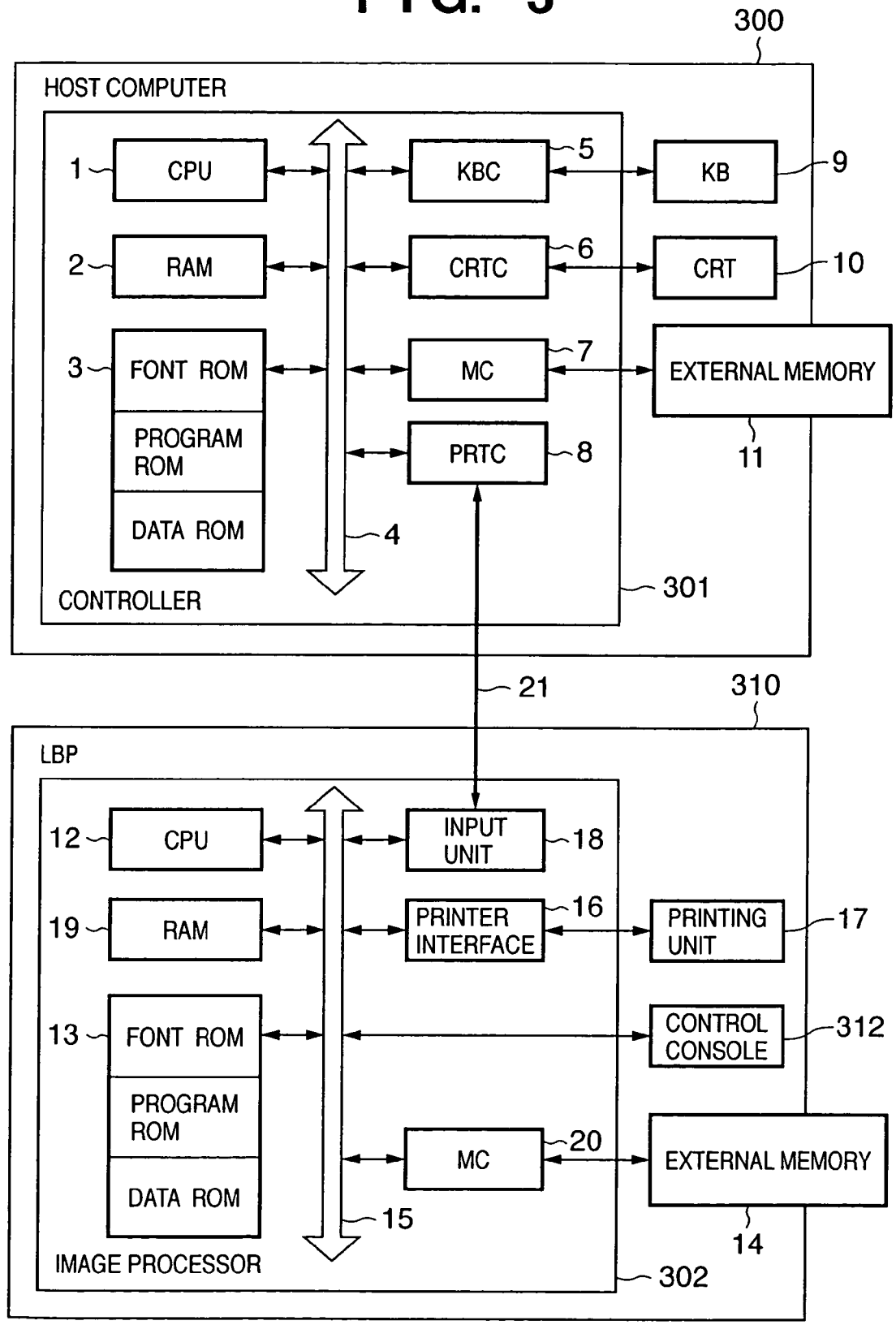
FIG. 3 is a block diagram illustrating a printer control system for controlling the laser printer according to the first embodiment of the present invention.

FIG. 3 is a block diagram illustrating a printer control system for controlling the laser printer according to the first embodiment of the present invention. Specifically, FIG. 3 is a diagram illustrating an electrical arrangement relating to the host computer 200 and laser printer 201 depicted in FIG. 2. The printer control system comprises a host computer 300 and a laser printer 310. It should be noted that as long as this printer control system executes the functions of the embodiment, it can be applied similarly to a stand-alone device, to a system comprising a plurality of devices or to a system in which processing is executed via a network such as a LAN.

As shown in FIG. 3, the host computer 300 has a controller 301 provided with a CPU 1 which, on the basis of a word processing program that has been stored in a program ROM of a ROM 3, executes the word processing of a document containing mixed objects such as graphics, images, text and tables (inclusive of spreadsheets, etc.). The CPU 1 performs overall control of various devices connected to a system bus 4. The program ROM in ROM 3 stores the control program, etc., of CPU 1.

Further, a font ROM in ROM 3 stores font data, etc., used when the above-mentioned word processing is executed by the CPU 1. Furthermore, a data ROM in ROM 3 stores various data used when word processing, etc., is executed by the CPU 1.

A RAM 2 in the host computer 300 functions as the main memory and work area of the CPU 1. A keyboard controller (KBC) 5 controls key inputs from a keyboard (KB) 9 and a pointing device, which is not shown. A CRT controller (CRTC) 6 controls the display on a CRT display 10.

A memory controller (MC) 7 controls access to an external memory 11, such as a hard disk or floppy disk, which stores a booting program, various applications, font data, user files and edited files.

A printer controller (PRTC) 8, which is connected to the laser printer 310 via a prescribed bidirectional interface 21, executes processing for controlling communication with the laser printer 310. It should be noted that the CPU 1 executes processing to expand (rasterize) outline fonts in a display RAM provided in, say, the RAM 2, and implements a WYSIWYG (What You See I What You Get) function on the CRT 10. Further, on the basis of commands designated by a mouse cursor (not shown) or the like on the CRT 10, the CPU 1 opens various windows that have been registered and executes a variety of data processing.

The laser printer 310 has a CPU 12 within an image processor 302. On the basis of a control program, etc., stored in a program ROM of a ROM 13 or a control program, etc., stored in an external memory 14, the CPU 12 controls overall access to various devices connected to a system bus 15 and outputs an image signal, which serves as output information, to a printing unit (printer engine) 17 connected via a printing-unit interface 16. The control program of the CPU 12, which is indicated by a flowchart illustrated later, may be stored in the program ROM of ROM 13.

Font data, etc., used when the above-described output information is generated is stored in a font ROM of ROM 13. If the external memory 14 such as a hard disk is not provided, information and the like utilized by the host computer 300 is stored in a data ROM of ROM 13. The CPU 12, which is capable of communicating with the host computer 300 via the input unit 18, is so as adapted as to be capable of reporting information within the laser printer 310 to the host computer 300. A RAM 19 functions as the main memory and work area, etc., of the CPU 12 and is so adapted that its memory capacity can be extended by optional RAM connected to an expansion port (not shown). It should be noted that RAM 19 is used as an area for expanding output information, an area for storing environment data and an NVRAM.

The external memory 14 such as the above-mentioned hard disk or an IC card has its access controlled by a memory controller (MC) 20. The external memory 14 is connected as an option and stores font data, an emulation program and form data, etc. A control console 312 is an array of switches and LED indicators for operating the control panel 151. It should be noted that the laser printer 310 is not limited to a single external memory and may have more than one external memory. Further, it may be so arranged that a plurality of optional font cards, which supplement internal fonts, and a plurality of external memories storing programs for interpreting printer control languages of different language systems can be connected. Furthermore, the laser printer 310 may have an NVRAM (not shown) for storing printer mode setting information entered from the control panel 151.

Figure 4:
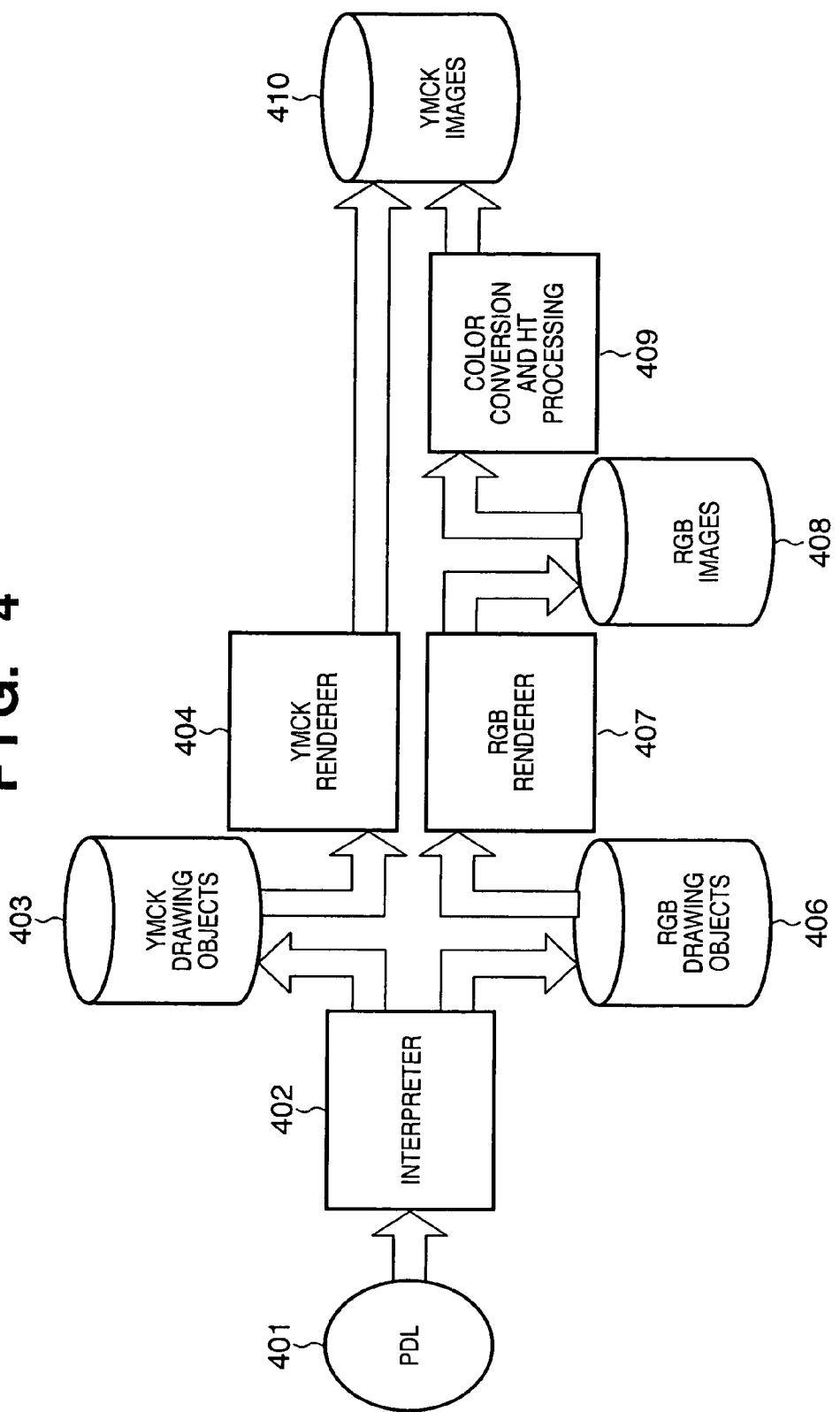
FIG. 4 is a diagram illustrating an example of the flow of processing executed by the laser printer according to the first embodiment of the present invention.

Reference will now be had to FIGS. 4 to 11 to describe the flow of processing executed by the image processor 302 of the image processing apparatus (laser printer) according to the first embodiment of the present invention. FIG. 4 is a diagram illustrating an example of the flow of processing executed by the laser printer according to the first embodiment of the present invention. Reference numerals 401 to 410 in FIG. 4 represent the nature of processing or data.

First, processing and data used in the image processor of the laser printer will be described with reference to FIG. 4. If PDL (Page Description Language) 401, which is one type of control code of an image processing apparatus, is input to the laser printer, an interpreter 402 translates the PDL, creates drawing objects and outputs the drawing objects as YMCK drawing objects 403 having the YMCK format or as RGB drawing objects 406 having the RGB format. These drawing objects are stored in respective ones of a YMCK rendering memory or RGB rendering memory. An RGB renderer 407 creates RGB images 408 by performing rendering using the RGB drawing objects 406 in the RGB rendering memory. Color conversion and HT processing 409 is then applied to thereby output a YMCK image 410 in the YMCK rendering memory.

On the other hand, in a case where a YMCK renderer 404 performs rendering using the YMCK drawing objects 403 output by the interpreter 402 and stored in the YMCK rendering memory, the YMCK renderer 404 outputs a YMCK image to the YMCK rendering memory as is.

More specifically, in the image processing apparatus (laser printer) according to this embodiment, control code (e.g., PDL) for controlling the image processing apparatus is input, the input control code is translated into drawing objects, and the interpreter judges whether rendering of the translated drawing objects is to be performed in the RGB format or YMCK format. As a result, a translated drawing object in one image is rendered in the RGB format by the RGB renderer 407, whereby an RGB image is created, and a translated another drawing object in an image the same as said one image is rendered in the YMCK format by the YMCK renderer 404, whereby a YMCK image is created. Furthermore, the RGB image is color-converted into a YMCK image by the color conversion and HT processing 409. The YMCK image created by the YMCK renderer 404 and the YMCK image obtained by the color conversion of the color conversion and HT processing 409 are output.

It should be noted that the entered control code for the image processing apparatus may be a control code that employs YMC or color space information in a complementary-color relationship with YMC.

Figure 5:
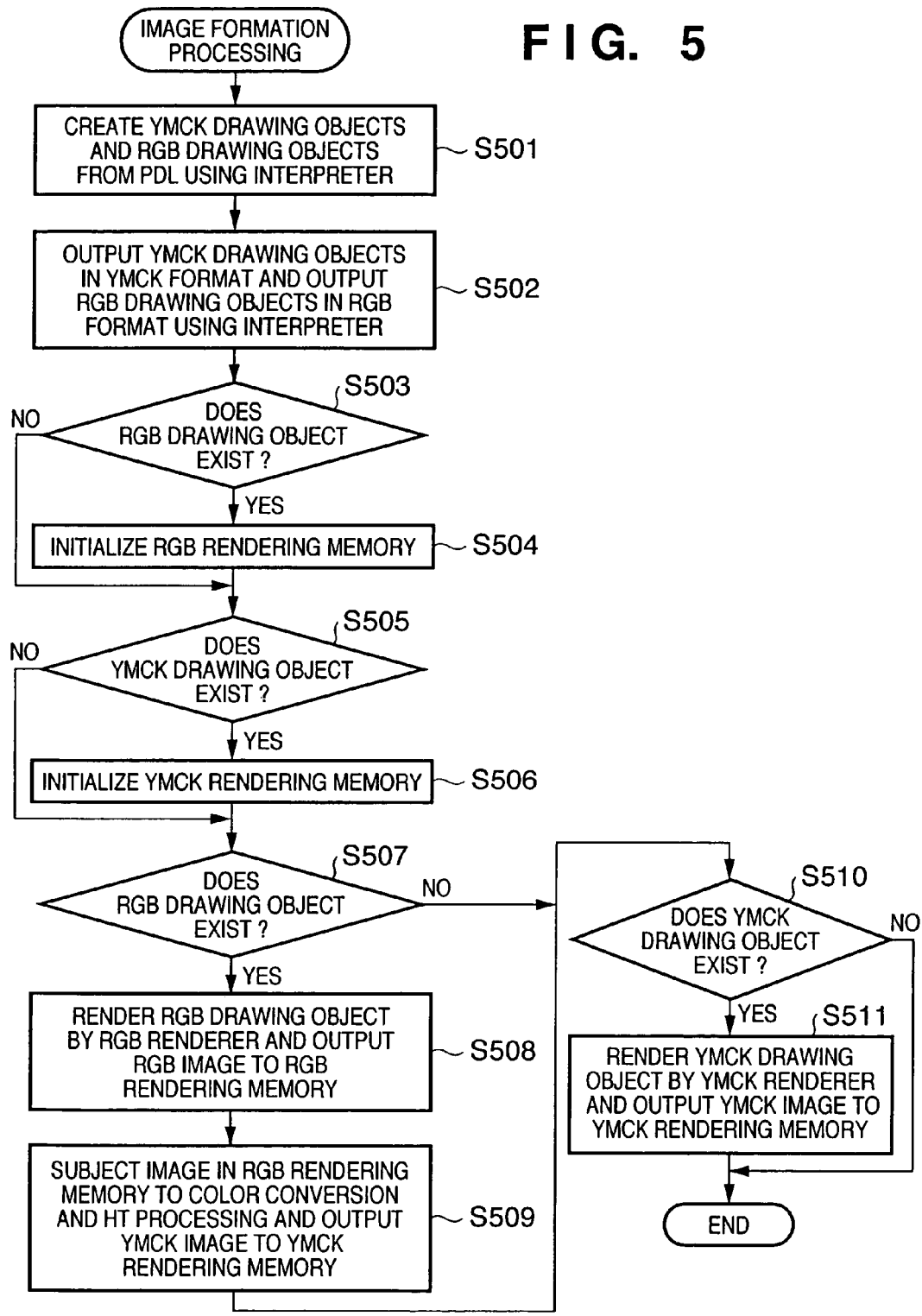
FIG. 5 is a flowchart useful in describing an example of image formation processing by the image processor of the laser printer according to the first embodiment of the present invention.

FIG. 5 is a flowchart useful in describing an example of image formation processing by the image processor of the laser printer according to the first embodiment of the present invention.

First, the interpreter 402 creates the YMCK drawing objects 403 and RGB drawing objects 406 from the PDL 401 (step S501). Next, the interpreter 402 outputs the YMCK drawing objects 403 in the YMCK format and the RGB drawing objects 406 in the RGB format (step S502).

It is determined whether an RGB drawing object 406 exists (step S503). If the determination is that an RGB drawing object 406 exists ("YES" at step S503), the RGB rendering memory is initialized (step S504) and control proceeds to step S505. On the other hand, if it is found that an RGB drawing object 406 does not exist ("NO" at step S503), then control proceeds to step S505 as is.

Next, it is determined at step S505 whether a YMCK drawing object 403 exists. If the determination is that a YMCK drawing object 403 exists ("YES" at step S505), the YMCK rendering memory is initialized (step S506) and control proceeds to step S507. On the other hand, if it is found that a YMCK drawing object 403 does not exist ("NO" at step S505), then control proceeds to step S507.

It is determined at step S507 whether an RGB drawing object 406 exists. If the determination is that an RGB drawing object 406 exists ("YES" at step S507), the RGB drawing object 406 is rendered by the RGB renderer 407 and the later outputs the RGB image 408 in the RGB rendering memory. Furthermore, the RGB image 408 in the RGB rendering memory is subjected to color conversion and HT processing 409, whereby the image is output as the YMCK image 410 in the YMCK rendering memory (step S509). Control then proceeds to step S510. On the other hand, if it is found that an RGB drawing object 406 does not exist ("NO" at step S507), control proceeds to step S510.

It is determined at step S510 whether a YMCK drawing object 403 exists. If the determination is that a YMCK drawing object 403 exists ("YES" at step S510), the YMCK drawing object 403 is rendered by the YMCK renderer 404 and the later outputs the YMCK image 410 in the YMCK rendering memory (step S511). Processing is then exited. On the other hand, if it is found that a YMCK drawing object 510 does not exist ("NO" at step S510), processing is exited.

As will be described below in greater detail, this embodiment is characterized in that the determination as to whether a drawing object is to be rendered in the RGB format or in the YMCK format is executed by processing for dividing a plurality of drawing objects into one or a plurality of group areas and processing for dividing a group area into a group in which rendering is performed in the RGB format or a group in which rendering is performed in the YMCK format.

Figure 6:
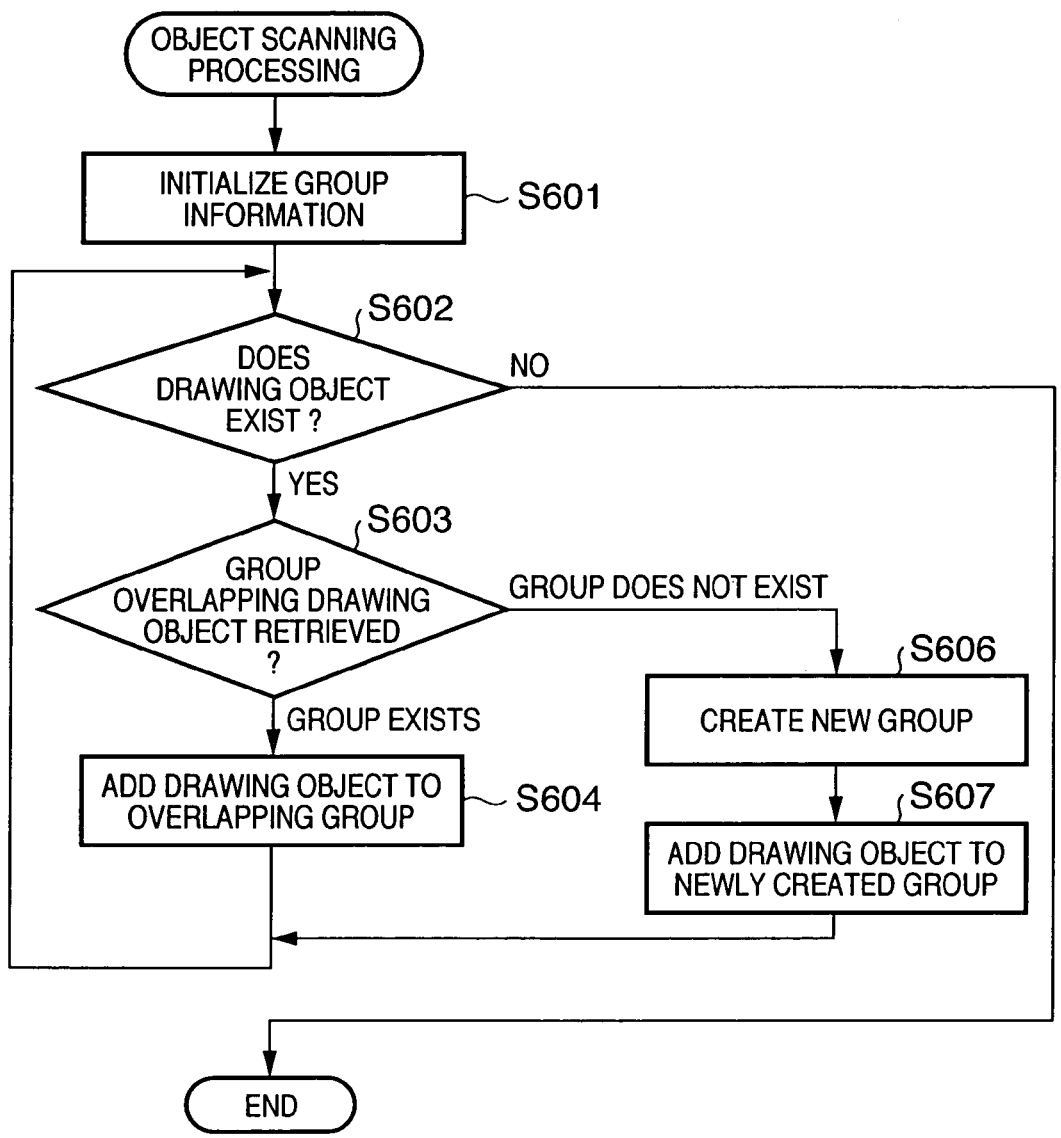
FIG. 6 is a flowchart useful in describing object scan processing for forming groups by scanning all drawing objects.

FIG. 6 is a flowchart useful in describing object scan processing for forming groups by scanning all drawing objects. It should be noted that the creation of a YMCK image described above is executed after grouping, which is described below, is carried out.

First, group information is initialized and a flag indicating that a group does not exist is set (step S601). Next, it is determined whether a drawing object exists (step S602). Control proceeds to processing from step S603 onward while a drawing object exists ("YES" at step S602). If a drawing object does not exist ("NO" at step S602), this processing is exited.

A group that overlaps the drawing object is searched for at step S603. If the result of the search is that an overlapping group exists, the drawing object is added to the overlapping group (step S604) and control returns to step S602. If an overlapping group does not exist, on the other hand, a new group is created (step S606) and the drawing object is added to the new group created (step S607). Control then returns to step S602.

More specifically, this embodiment is characterized by the following: In the grouping processing, first one or a plurality of drawing objects are grouped as a single group area if a plurality of drawing objects exist. Next, it is determined whether an ungrouped drawing object exists. If an ungrouped drawing object exists, overlap between this drawing object and the group area is detected. If the result of detection is that there is no overlap between the drawing object and the group area, the drawing object is made a new group area. If the result of detection is that there is overlap between the drawing object and the group area, then the area of the drawing object is incorporated in the group area to thereby update the group area.

It should be noted that the processing for dividing the above-mentioned group area into a group in which rendering is performed in the RGB format or a group in which rendering is performed in the YMCK format may be adapted so as to comprise steps of discriminating the extent of a color difference that is produced by subjecting the group area to YMCK rendering, adopting the group area as a group in which rendering is performed in the RGB format if the color difference is outside an allowable range, and adopting the group area as a group in which rendering is performed in the YMCK format if the color difference is within an allowable range.

Figure 7:
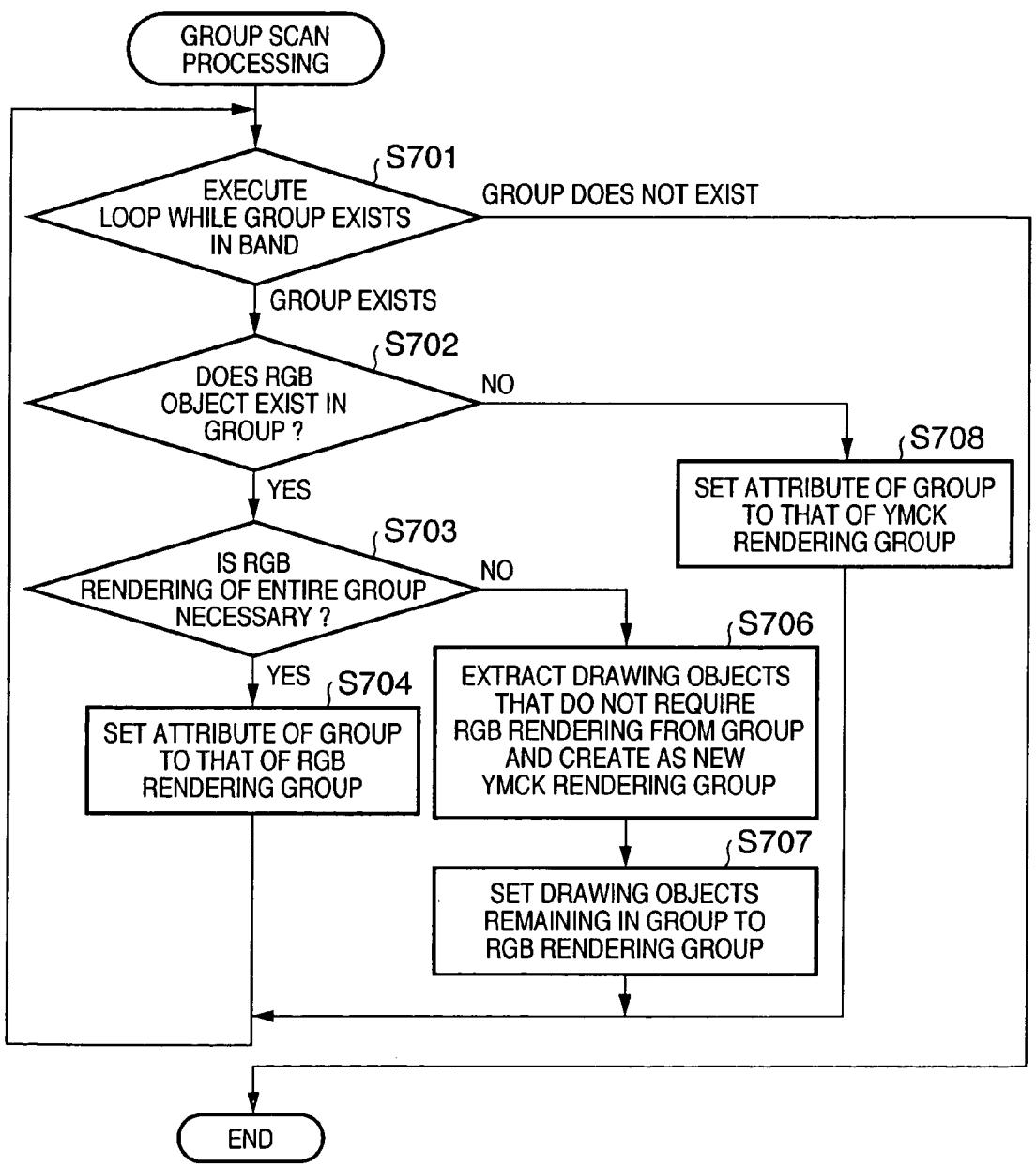
FIG. 7 is a flowchart useful in describing group scan processing that decides the attribute of a group.

FIG. 7 is a flowchart useful in describing group scan processing that decides the attribute of a group. First, it is determined whether a group exists within a band (step S701). Processing from step S702 onward is executed while a group exists. If a group does not exist, on the other hand, then this processing is exited.

It is determined at step S702 whether an RGB drawing object exists within the group. If an RGB drawing object exists within the group ("YES" at step S702), then it is determined whether it is necessary for the entire group to undergo RGB rendering (step S703). On the other hand, if it is determined that an RGB drawing object does not exist ("NO" at step S702), then the attribute of the group is set to that of a YMCK rendering group (step S708). Control then returns to step S701.

If it is determined that it is necessary to subject the entire group to RGB rendering ("YES" at step S703), the attribute of the group is set to that of an RGB rendering group (step S704), after which control returns to step S701. On the other hand, if it is determined that it is unnecessary to subject the entire group to RGB rendering ("NO" at step S703), then the drawing objects that do not require RGB rendering are extracted from the group to create a new YMCK rendering group (step S706). The drawing objects remaining in the group are set as an RGB rendering group (step S707) and control returns to step S701.

In accordance with this embodiment, the processing for dividing a group area into a group in which rendering is performed in the RGB format or a group in which rendering is performed in the YMCK format may be adapted as follows: First, if a drawing object to be rendered in the RGB format does not exist in the group area, the group area is adopted as a group in which rendering is performed in the YMCK format. Next, if a drawing object to be rendered in the RGB format exists in the group area, it is determined whether it is necessary to subject the group area to rendering according to the RGB format. If it is determined that it is necessary to subject the group area to rendering in the RGB format, then the group area is adopted as a group in which rendering is performed in the RGB format. On the other hand, if it is determined that it is unnecessary to subject the group area to rendering in the RGB format, then drawing objects that do not require rendering in the RGB format in this group area are made a new group area in which rendering is performed in the YMCK format and the remaining area is adopted as a group area in which rendering is performed in the RGB format.

Figure 8:
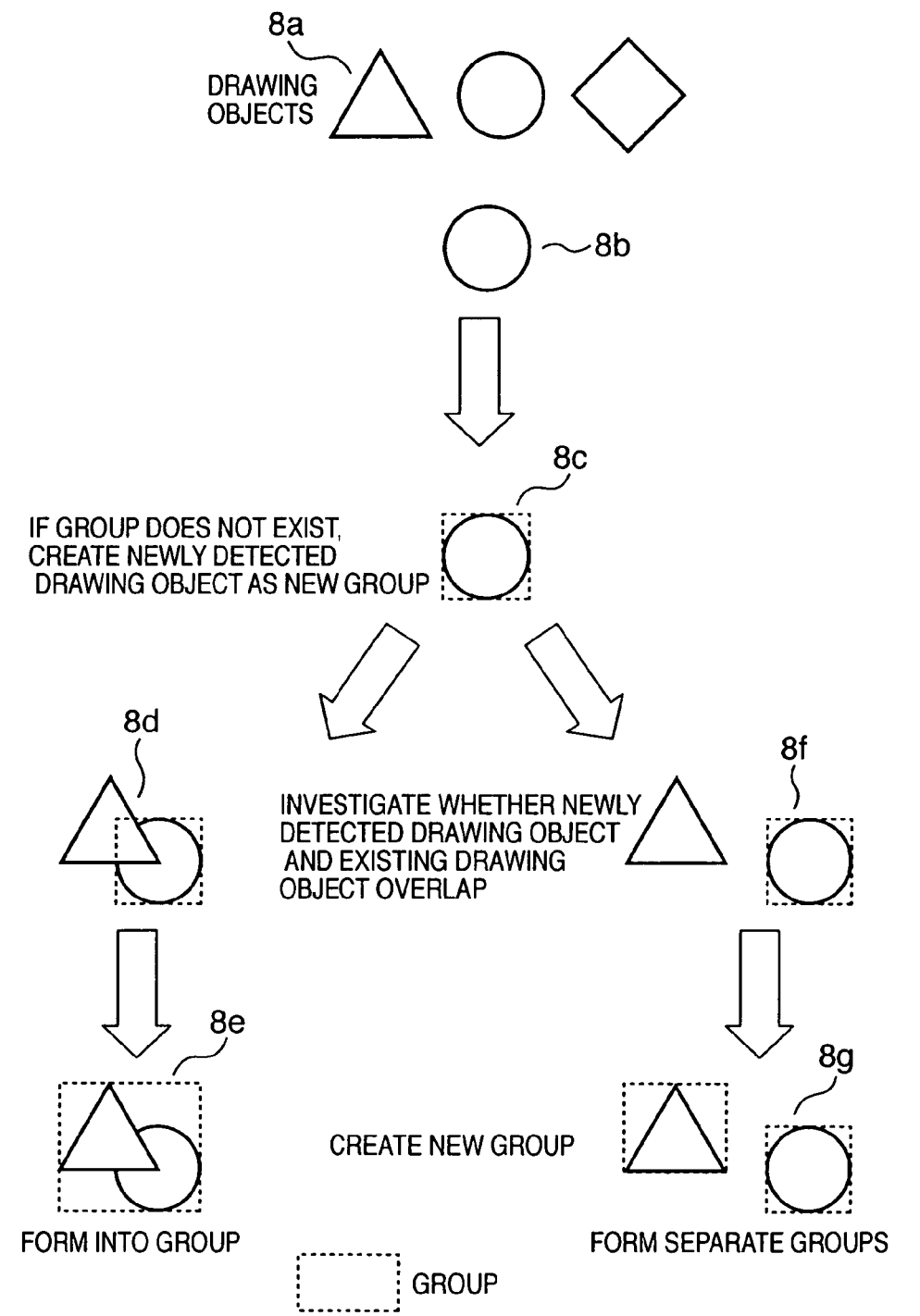
FIG. 8 is a diagram useful in describing a specific example of object scan processing in which an interpreter registers a new drawing object in a group in a case where a group does not exist.

FIG. 8 is a diagram useful in describing a specific example of object scan processing in which an interpreter registers a new drawing object in a group in a case where a group does not exist. Reference characters 8a to 8g in FIG. 8 indicate the manner in which groups are formed from drawing objects.

First, reference characters 8a denote an example of drawing objects to be grouped. Here three drawing objects, namely a triangular object, a circular object and a diamond-shaped object. Assume that the circular drawing object at 8b has been detected first. If a group does not yet exist, then this circular drawing object is created as a new group (referred to as, e.g., "group A"), as indicated at 8c. The area of group A is defined by a rectangle within which the circular drawing object will fit.

Next, assume that the triangular drawing object has been detected anew, as indicated at 8d. If this drawing object overlaps group A, which is the case at 8d, then the triangular drawing object is added to group A, as illustrated at 8e. If the newly detected triangular drawing object does not overlap group A, as indicated at 8f, then the triangular drawing object is created as a new group (referred to as, e.g., "group B"), as indicated at 8g.

Figure 9:
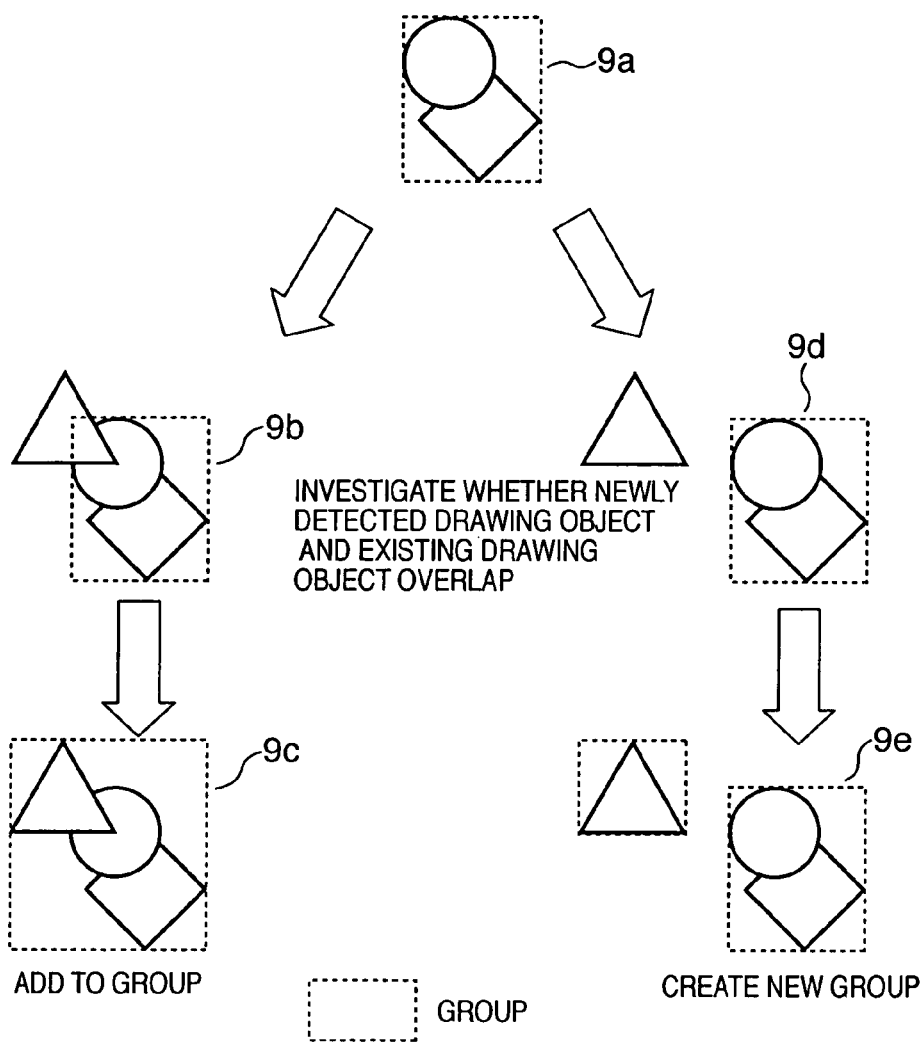
FIG. 9 is a diagram illustrating a specific example of object scan processing in which an interpreter registers a new drawing object in a group in a case where a group composed of a plurality of drawing objects exists.

FIG. 9 is a diagram illustrating a specific example of object scan processing in which an interpreter registers a new drawing object in a group in a case where a group composed of a plurality of drawing objects exists. Reference characters 9a to 9f in FIG. 9 indicate the manner in which groups are formed from drawing objects.

First, reference characters 9a denote a group (referred to as, e.g., "group C") composed of a circular drawing object and a diamond-shaped drawing object. This indicates that the area of group C is defined by a rectangle within which all of the drawing objects in the group will fit. If a triangular drawing object is detected anew and it overlaps group C, then the triangular drawing object is added to group C, as indicated at 9c. On the other hand, if the triangular drawing object is detected and it does not overlap group C, then this triangular drawing object is created as a new group (referred to as, e.g., "group D"), as indicated at 9e.

Figure 10:
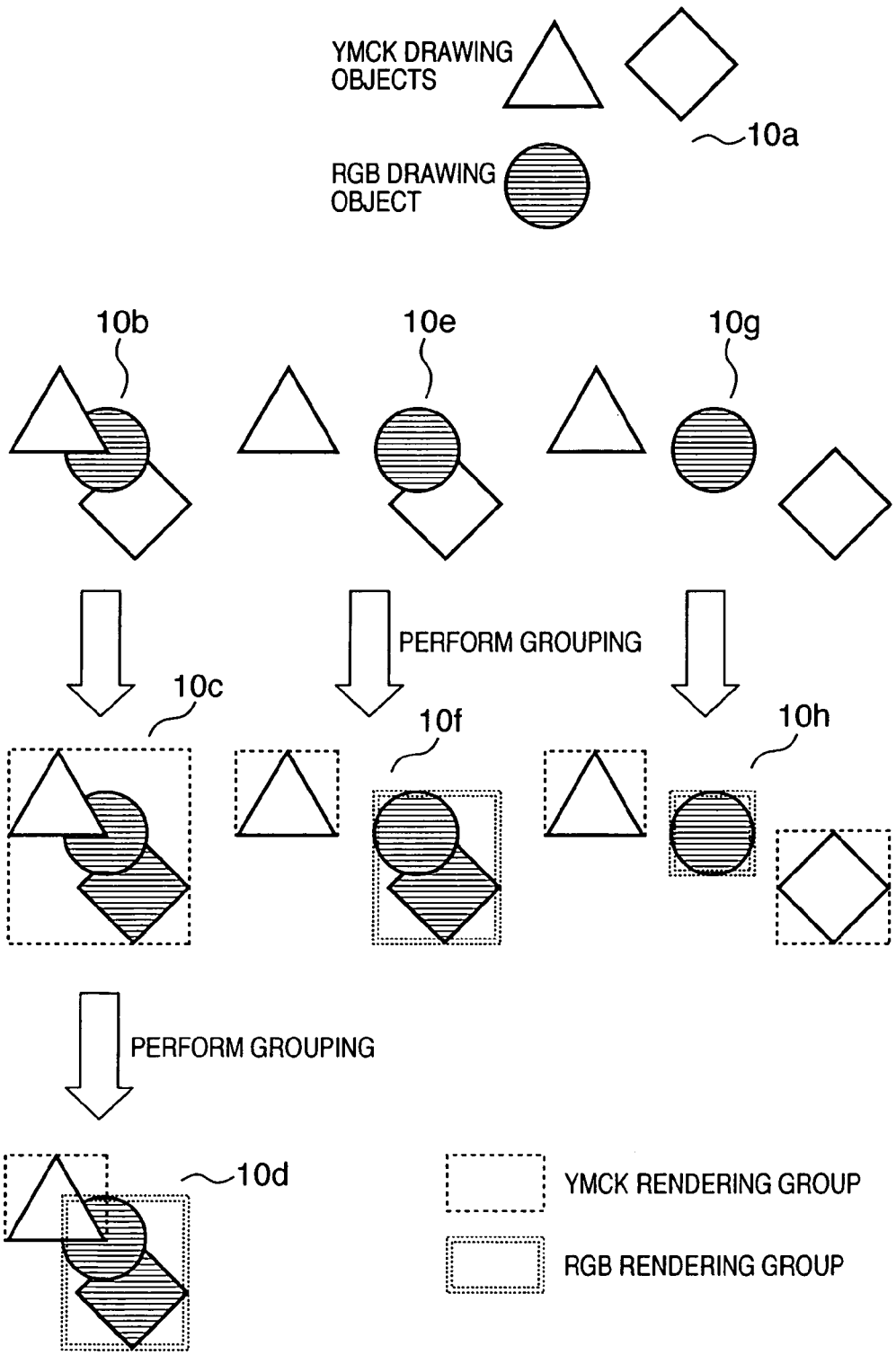
FIG. 10 is a diagram illustrating a specific example of group scan processing in which an interpreter divides a group into a YMCK rendering group and an RGB rendering group.

FIG. 10 is a diagram illustrating a specific example of group scan processing in which an interpreter divides a group into a YMCK rendering group and an RGB rendering group. Reference characters 10a to 10h in FIG. 10 represent the steps involved.

First, consider triangular and diamond-shaped YMCK drawing objects and a circular RGB drawing object, as indicated at 10a. In a case where the three objects overlap, the triangular drawing object would be subjected to YMCK-overwrite rendering and the diamond-shaped drawing object would require RGB rendering.

If the three objects overlap under the above-mentioned conditions, as shown at 10b, then the group (referred to as, e.g., "group E") is handled as an RGB rendering group at 10c. Here it is required that the diamond-shaped drawing object be handled as an RGB drawing object, though the triangular drawing object may remain as a YMCK drawing object. As indicated at 10d, therefore, the triangular drawing object is classified as a new YMCK drawing object (referred to as, e.g., "group F") and the triangular drawing object classified as group F is deleted from group E.

Further, in a case where a triangular drawing object exists independently and circular and diamond-shaped drawing objects overlap, as indicated at 10e, the triangular drawing object is classified as a new YMCK rendering group and the circular and diamond-shaped drawing objects are classified as an RGB rendering group, as shown at 10f.

Furthermore, in a case where each drawing object exists independently, as indicated at 10g, the triangular drawing object and the diamond-shaped drawing object are classified as a YMCK rendering group and the circular drawing object is classified as an RGB rendering group.

Figure 11:
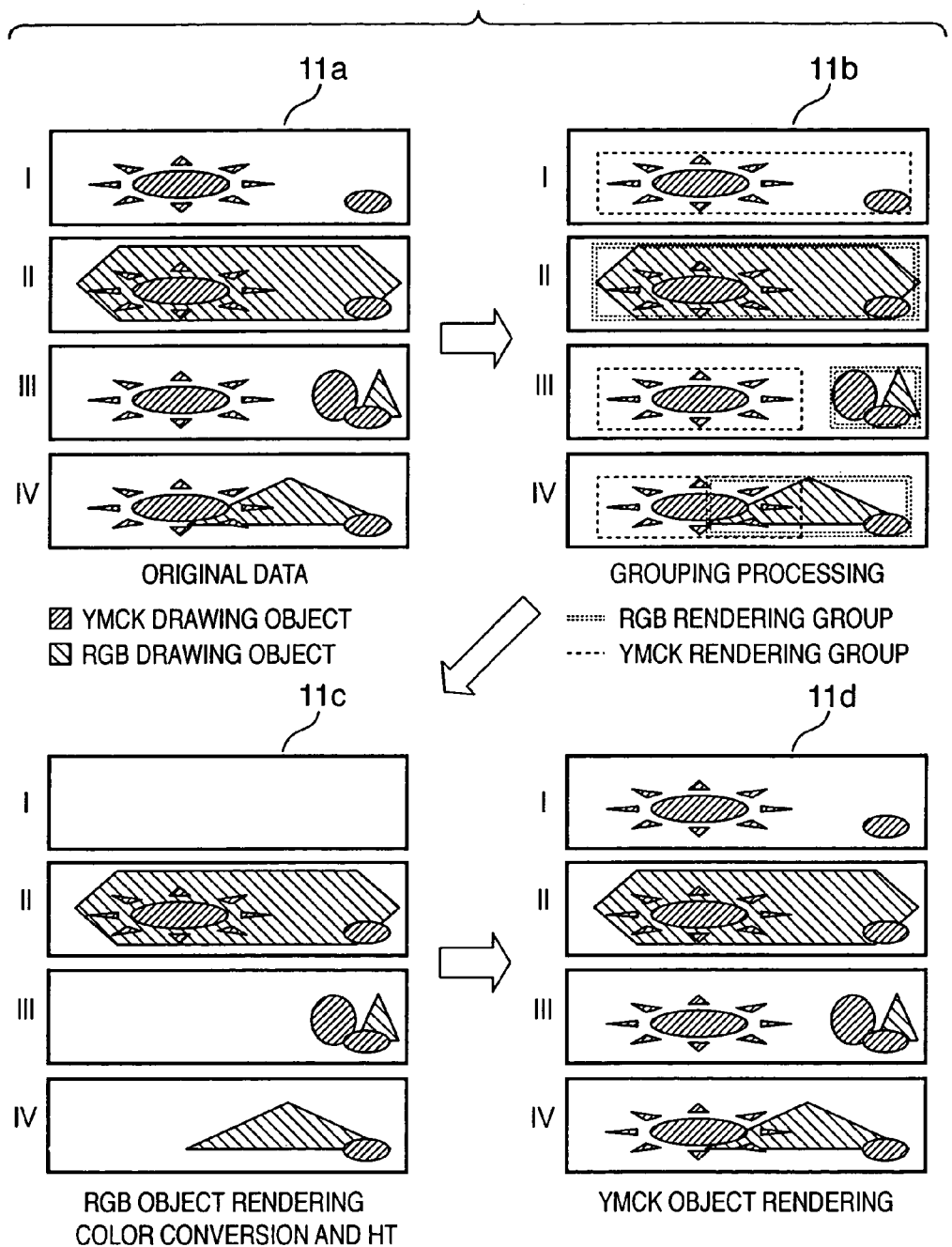
FIG. 11 is a diagram illustrating a specific example of processing for when rendering is performed based upon drawing objects that have been output from an interpreter.

FIG. 11 is a diagram illustrating a specific example of processing for when rendering is performed based upon drawing objects that have been output from an interpreter. Reference characters 11a to 11d represent the processing steps involved, and characters I to IV at each step indicate examples of graphics used in rendering.

First, at 11a in FIG. 11, I denotes data constituted solely by YMCK drawing objects, II denotes data in which an RGB drawing object is rendered over all YMCK drawing objects, III denotes data in which a YMCK drawing object existing independently and a separate YMCK drawing object and RGB drawing object overlap the independent YMCK drawing object, and IV denotes data in which an RGB drawing object is rendered over a YMCK drawing object and a YMCK drawing object is rendered over the RGB drawing object.

Next, as a result of grouping processing, as illustrated at 11b in FIG. 11, the I group becomes one YMCK rendering group, the II group becomes one RGB rendering group, the III group becomes two groups, namely a YMCK rendering group and an RGB rendering group, and the IV group becomes a group in which the YMCK-overwrite object becomes a YMCK rendering group and the remaining objects become an RGB rendering group.

Next, as a result of object rendering and color conversion/HT processing, as shown at 11c, an RGB rendering group does not exist for data I and, hence, rendering is not carried out. With regard to II, III and IV, the drawing objects of the RGB rendering group are rendered.

Furthermore, owing to YMCK object rendering, as shown at 11d, drawing objects of the YMCK rendering group are rendered in regard to I, III and IV. With regard to II, a YMCK rendering group does not exist and therefore rendering is not performed.

It goes without saying that the rendering data applicable in this embodiment is not limited to the four examples shown in FIG. 11.

Second Embodiment

A second embodiment of the present invention will now be described.

In this embodiment it is possible to further reduce loss at changeover between a YMCK rendering group and an RGB rendering group in the first embodiment. FIG. 12 is a diagram useful in describing the processing of rendering data composed of a YMCK drawing object and an RGB drawing object in the second embodiment of the present invention.

The first embodiment described above is premised on the fact that a rendering area has a certain degree of width and height. In this embodiment, on the other hand, as shown at 12a in FIG. 12, consider a case where a large YMCK drawing object and a small RGB drawing object overlap very slightly. Here if a group were to be classified as an RGB rendering group, it would be necessary to subject the entire group to RGB rendering and hence there is a possibility that rendering speed will decline significantly in comparison with YMCK rendering.

Accordingly, as indicated at 12b, the rendering area is divided into four portions and a drawing object is created in each rendering area. It will suffice if YMCK rendering groups are created in areas 1 and 2, an RGB rendering group in area 3 and a YMCK rendering group and an RGB rendering group in area 4 by such division. This makes it possible to reduce loss at changeover between a YMCK rendering group and an RGB rendering group in the first embodiment.

Furthermore, as indicated at 12c, by eventually adopting one line as the width of a rendering area (i.e., by adopting a line renderer), the loss at changeover between a YMCK rendering group and an RGB rendering group can be reduced by a wide margin.

It goes without saying that the rendering data applicable in this embodiment is not limited to solely to the example shown in FIG. 12.

Further, the method of dividing up a rendering area may be one in which the rendering area is divided in the height direction and not just the width direction, and the rendering area may of course be divided in both the width and height directions. Furthermore, by adopting a line renderer, it is possible to reduce the loss at changeover between a YMCK rendering group and an RGB rendering group. On the other hand, an increase in time required for the interpreter to create a drawing object cannot be avoided. Accordingly, it should be so arranged that the rendering area is divided so as to reduce the total amount of processing by the interpreter and renderer.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

Thus, in accordance with the present invention, as described above, drawing objects are collected on a group-by-group basis and rendering is switched between YMCK rendering and RGB rendering to thereby raise the image quality of a YMCK output image and mitigate a decline in processing speed.

The present invention is not limited to the above embodiments and various changes and modifications can be made within the spirit and scope of the present invention. Therefore, to apprise the public of the scope of the present invention, the following claims are made.

What is claimed is:

1. An image processing method comprising:
   an input step of inputting an image processing apparatus control code;
   a translation step of translating the image processing apparatus control code into a drawing object;
   a judging step of judging whether rendering of the drawing object is to be performed in an RGB format or YMCK format;
   a first rendering step of rendering a drawing object in one image, which has been obtained by translation at said translation step, in the RGB format, thereby creating an RGB image;
   a second rendering step of rendering another drawing object in an image the same as said one image, which has been obtained by translation at said translation step, in the YMCK format, thereby creating a YMCK image;
   a color conversion step of color-converting the RGB image to a YMCK image; and
   an output step of outputting the YMCK image created by said second rendering step and the YMCK image obtained by the color conversion at said color conversion step,
   wherein said judging step includes:
      a grouping step of dividing a plurality of drawing objects into one or a plurality group areas; and
      an attribute deciding step of dividing the group area into a group in which rendering is performed in the RGB format or a group in which rendering is performed in the YMCK format, wherein said attribute deciding step includes:
a discriminating step of discriminating extent of a color difference that is produced by subjecting the group area to YMCK rendering;
if the color difference is outside an allowable range, a first attribute deciding step of adopting the group area as a group in which rendering is performed in the RGB format; and
if the color difference is within the allowable range, a second attribute deciding step of adopting the group area as a group in which rendering is performed in the YMCK format, and
wherein said attribute deciding step includes:
a third attribute deciding step of adopting the group area as a group in which rendering is performed in the YMCK format if a drawing object to be rendered in the RGB format does not exist in the group area;
a necessity determining step of determining whether it is necessary to render the group area based upon the RGB format if a drawing object to be rendered in the RGB format exists in the group area;
a fourth attribute deciding step of adopting the group area as an area in which rendering is performed in the RGB format if it is determined at said necessity determining step that it is necessary to render the group area in the RGB format; and
if it is determined at said necessity determining step that it is unnecessary to render the group area in the RGB format, a fifth attribute deciding step of adopting a drawing object that does not require rendering in the RGB mode in the group area as a new group area in which rendering is performed in the YMCK format, and adopting the remaining area as a group area in which rendering is performed in the RGB format.

2. The method according to claim 1, wherein said input step includes inputting an image processing apparatus control code that employs YMC or color space information in a complementary-color relationship with YMC.

3. The method according to claim 1, wherein said grouping step includes:
a first grouping step of grouping one or a plurality of drawing objects as one group area if a plurality of drawing objects exist;
a determination step of determining whether an ungrouped drawing object exists;
if an ungrouped drawing object exists, detecting whether said drawing object and the group area overlap;
if said drawing object and the group area do not overlap, a second grouping step of making said drawing object a new group area; and
if said drawing object and the group area overlap, an updating step of incorporating the area of said drawing object in the group area to thereby update the group area.

4. A computer-readable medium storing a computer program for causing a computer to implement the following procedures:
an input procedure for inputting an image processing apparatus control code;
a translation procedure for translating the image processing apparatus control code into a drawing object;
a judging procedure for judging whether rendering of the drawing object is to be performed in an RGB format or YMCK format;
a first rendering procedure for rendering a drawing object in one image, which has been obtained by translation in said translation procedure, in the RGB format, thereby creating an RGB image;
a second rendering procedure for rendering another drawing object in an image the same as said one image, which has been obtained by translation in said translation procedure, in the YMCK format, thereby creating a YMCK image;
a color conversion procedure for color-converting the RGB image to a YMCK image; and
an output procedure for outputting the YMCK image created by said second rendering procedure and the YMCK image obtained by the color conversion in said color conversion procedure,
wherein said judging procedure includes:
a grouping procedure of dividing a plurality of drawing objects into one or a plurality group areas; and
an attribute deciding procedure of dividing the group area into a group in which rendering is performed in the RGB format or a group in which rendering is performed in the YMCK format,
wherein said attribute deciding procedure includes:
a discriminating procedure of discriminating extent of a color difference that is produced by subjecting the group area to YMCK rendering;
if the color difference is outside an allowable range, a first attribute deciding procedure of adopting the group area as a group in which rendering is performed in the RGB format; and
if the color difference is within the allowable range, a second attribute deciding procedure of adopting the group area as a group in which rendering is performed in the YMCK format, and
wherein said attribute deciding procedure includes:
a third attribute deciding procedure of adopting the group area as a group in which rendering is performed in the YMCK format if a drawing object to be rendered in the RGB format does not exist in the group area;
a necessity determining procedure of determining whether it is necessary to render the group area based upon the RGB format if a drawing object to be rendered in the RGB format exists in the group area;
a fourth attribute deciding procedure of adopting the group area as an area in which rendering is performed in the RGB format if it is determined at said necessity determining step that it is necessary to render the group area in the RGB format; and
if it is determined in said necessity determining procedure that it is unnecessary to render the group area in the RGB format, a fifth attribute deciding procedure of adopting a drawing object that does not require rendering in the RGB mode in the group area as a new group area in which rendering is performed in the YMCK format, and adopting the remaining area as a group area in which rendering is performed in the RGB format.

5. An image processing apparatus comprising:
input means for inputting an image processing apparatus control code;
translation means for translating the image processing apparatus control code into a drawing object;
judging means for judging whether rendering of a drawing object is to be performed in an RGB format or YMCK format;

first rendering means for rendering a drawing object in one image, which has been obtained by translation by said translation means, in the RGB format, thereby creating an RGB image;

second rendering means for rendering another drawing object in an image the same as said one image, which has been obtained by translation by said translation means, in the YMCK format, thereby creating a YMCK image;

color conversion means for color-converting the RGB image to a YMCK image; and output means for outputting the YMCK image created by said second rendering means and the YMCK image obtained by the color conversion by said color conversion means, wherein said judging means includes:
grouping means for dividing a plurality of drawing objects into one or a plurality group areas; and
attribute deciding means for dividing the group area into a group in which rendering is performed in the RGB format or a group in which rendering is performed in the YMCK format, and wherein said attribute deciding means includes:
third attribute deciding means for adopting the group area as a group in which rendering is performed in the YMCK format if a drawing object to be rendered in the RGB format does not exist in the group area;
necessity determining means for determining whether it is necessary to render the group area based upon the RGB format if a drawing object to be rendered in the RGB format exists in the group area;
fourth attribute deciding means for adopting the group area as an area in which rendering is performed in the RGB format if it is determined by said necessity determining means that it is necessary to render the group area in the RGB format; and
fifth attribute deciding means which is for, if it is determined by said necessity determining means that it is unnecessary to render the group area in the RGB format, adopting a drawing object that does not require rendering in the RGB mode in the group area as a new group area in which rendering is performed in the YMCK format, and adopting the remaining area as a group area in which rendering is performed in the RGB format.

6. The apparatus according to claim 5, wherein said attribute deciding means includes:
discriminating means for discriminating extent of a color difference that is produced by subjecting the group area to YMCK rendering;
first attribute deciding means which is for, if the color difference is outside an allowable range, adopting the group area as a group in which rendering is performed in the RGB format; and
second attribute deciding means which is for, if the color difference is within the allowable range, adopting the group area as a group in which rendering is performed in the YMCK format.

7. The apparatus according to claim 5, wherein said grouping means includes:
first grouping means for grouping one or a plurality of drawing objects as one group area if a plurality of drawing objects exist;
determination means for determining whether an ungrouped drawing object exists;
detecting means which, if an ungrouped drawing object exists, is for detecting whether said drawing object and the group area overlap;
second grouping means which is for, if said drawing object and the group area do not overlap, making said drawing object a new group area; and
updating means which is for, if said drawing object and the group area overlap, incorporating the area of said drawing object in the group area to thereby update the group area.

8. The apparatus according to claim 5, wherein said input means inputs an image processing apparatus control code that employs YMC or color space information in a complementary-color relationship with YMC.

* * * * *

UNITED STATES PATENT AND TRADEMARK OFFICE
CERTIFICATE OF CORRECTION

| | | |
|---|---|---|
| PATENT NO. | : 7,359,089 B2 | |
| APPLICATION NO. | : 10/729923 | |
| DATED | : April 15, 2008 | |
| INVENTOR(S) | : Hitoshi Imai | |

It is certified that error appears in the above-identified patent and that said Letters Patent is hereby corrected as shown below:

COLUMN 3:

Line 41, "a" should read --an--; and
    Line 63, "f d" should read --fed--.

COLUMN 5:

Line 51, "so as adapted" should read --adapted so--.

COLUMN 6:

Line 46, "another" should read --additional--.

COLUMN 7:

Line 19, "later" should read --latter--; and
    Line 31, "later" should read --latter--.

COLUMN 11:

Line 13, "to" (first occurrence) should be deleted;
    Line 50, "scrip" should read --script--; and
    Line 51, "Example" should read --Examples--.

COLUMN 12:

Line 63, "plurality" should read --plurality of--.

COLUMN 14:

Line 18, "plurality" should read --plurality of--.

UNITED STATES PATENT AND TRADEMARK OFFICE
CERTIFICATE OF CORRECTION

PATENT NO. : 7,359,089 B2
APPLICATION NO. : 10/729923
DATED : April 15, 2008
INVENTOR(S) : Hitoshi Imai It is certified that error appears in the above-identified patent and that said Letters Patent is hereby corrected as shown below:

<u>COLUMN 15</u>:

Line 18, "plurality" should read --plurality of--.

Signed and Sealed this

Seventeenth Day of February, 2009

JOHN DOLL
*Acting Director of the United States Patent and Trademark Office*